(12) United States Patent
Hashimoto et al.

(10) Patent No.: US 7,615,594 B2
(45) Date of Patent: Nov. 10, 2009

(54) GRAFT COPOLYMERS AND IMPACT-RESISTANT FLAME-RETARDANT RESIN COMPOSITIONS CONTAINING THE SAME

(75) Inventors: Tomomichi Hashimoto, Osaka (JP); Kazunori Saegusa, Osaka (JP); Hiroshi Tsuneishi, Osaka (JP); Nobuo Miyatake, Hyogo (JP); Akira Takaki, Osaka (JP)

(73) Assignee: Kaneka Corporation, Osaka-Shi (JP)

( * ) Notice: Subject to any disclaimer, the term of this patent is extended or adjusted under 35 U.S.C. 154(b) by 360 days.

(21) Appl. No.: 10/466,130

(22) PCT Filed: Feb. 17, 2003

(86) PCT No.: PCT/JP03/01622

§ 371 (c)(1), (2), (4) Date: Sep. 27, 2004

(87) PCT Pub. No.: WO03/068835

PCT Pub. Date: Aug. 21, 2003

(65) Prior Publication Data

US 2005/0038149 A1 Feb. 17, 2005

(30) Foreign Application Priority Data

Feb. 15, 2002 (JP) .............................. 2002-038664
May 8, 2002 (JP) .............................. 2002-133077

(51) Int. Cl.
C08F 283/12 (2006.01)

(52) U.S. Cl. ...................................... 525/105; 525/464

(58) Field of Classification Search ................. 525/105, 525/464
See application file for complete search history.

(56) References Cited

U.S. PATENT DOCUMENTS

| | | | | |
|---|---|---|---|---|
| 4,885,209 A | | 12/1989 | Lindner et al. | |
| 4,939,206 A | * | 7/1990 | Wang ........................... | 525/63 |
| 5,585,436 A | * | 12/1996 | Niessner et al. ............. | 525/105 |
| 2004/0220302 A1 | * | 11/2004 | Saegusa et al. ............. | 524/161 |

FOREIGN PATENT DOCUMENTS

| | | | |
|---|---|---|---|
| CN | 1327464 A | * | 12/2001 |
| EP | 0 326 041 A1 | | 8/1989 |
| EP | 1 142 951 | * | 10/2001 |
| EP | 1 142 951 A1 | | 10/2001 |
| EP | 1 174 466 | * | 1/2002 |
| EP | 1 174 466 A1 | | 1/2002 |
| EP | 1 338 625 A1 | | 8/2003 |
| EP | 1 505 123 A1 | | 2/2005 |
| JP | 54-36365 | | 3/1979 |
| JP | 3-48947 | | 7/1991 |
| JP | 05-25228 A | | 2/1993 |
| JP | 5-214205 A | | 8/1993 |
| JP | 7-33836 A | | 2/1995 |
| JP | 8-113712 | | 5/1996 |
| JP | 10-139964 | | 5/1998 |
| JP | 2000-17029 A | | 1/2000 |
| JP | 2000-226420 A | | 8/2000 |
| JP | 2000-264935 A | | 9/2000 |
| JP | 2001-261755 | * | 9/2001 |
| JP | 2001-261755 A | | 9/2001 |
| JP | 2001-329141 A | | 11/2001 |
| TW | 181966 | | 4/1992 |
| WO | WO 03/004566 A1 | | 1/2003 |
| WO | 03/091342 | * | 11/2003 |

OTHER PUBLICATIONS

English Language Translation JP 2001-261755, Sep. 26, 2001.*
European Search Report of the Corresponding European Patent Application No. EP 08 15 5938, mailed on Jul. 29, 2008, 5 pages.

* cited by examiner

*Primary Examiner*—Margaret G Moore
(74) *Attorney, Agent, or Firm*—Westerman, Hattori, Daniels & Adrian, LLP

(57) ABSTRACT

The present invention provides a polyorganosiloxane-containing graft copolymer
  which is obtainable by polymerizing 0.5 to 10 parts by weight of a vinyl monomer (B) comprising 100 to 50% by weight of a polyfunctional monomer (b-1) containing two or more polymerizable unsaturated bonds in the presence of 40 to 90 parts of polyorganosiloxane particles,
  followed by further polymerizing 5 to 50 parts by weight of a vinyl monomer (C);

A polyorganosiloxane-containing graft copolymer
  which is obtainable by polymerizing 0 to 10 parts by weight of a vinyl monomer (B) comprising 100 to 50% by weight of a polyfunctional monomer containing two or more polymerizable unsaturated bonds in the presence of 30 to 95 parts of a polyorganosiloxane in a latex form as obtained by seed polymerization using, as a seed polymer, a hydrophilic polymer capable of swelling in the corresponding organosiloxane,
  followed by further polymerizing 5 to 70 parts by weight of a vinyl monomer (C);
a flame retardant which comprises said copolymer; and
a resin composition which comprises said retardant and a thermoplastic resin.

22 Claims, No Drawings

US 7,615,594 B2

GRAFT COPOLYMERS AND IMPACT-RESISTANT FLAME-RETARDANT RESIN COMPOSITIONS CONTAINING THE SAME

RELATED APPLICATIONS

This application is a nationalization of PCT Application No. PCT/JP03/01622 filed Feb. 17, 2003. This application claims priority from Japanese Patent Application No. 2002-038664 filed on Feb. 15, 2002 and Japanese Patent Application No. 2002-133077 filed on May 8, 2002.

TECHNICAL FIELD

The present invention relates to polyorganosiloxane-containing graft copolymers and impact-resistant, flame-retardant resin compositions containing the same.

BACKGROUND ART

Owing to their good impact resistance, heat resistance and electric characteristics, among others, thermoplastic resins, in particular polycarbonate resins, are widely used as materials of electric and electronic parts, OA (office automation) apparatus and instruments, and household utensils, or as building materials. Polycarbonate resins, though higher in flame retardancy as compared with polystyrene and other resins, are required to be highly flame retardant in particular in such fields as electric and electronic parts, OA apparatus and instruments and the like and, therefore, attempts have been made to improve their flame retardancy by adding various flame retardants. Thus, for instance, the addition of organohalogen compounds or organophosphorus compounds has so far been in wide practice. However, organohalogen compounds and organophosphorus compounds have a problem from the toxicity viewpoint. In particular, it is a drawback of organohalogen compounds that they generate a corrosive gas upon combustion thereof. Thus, the demand for halogen-free and phosphorus-free flame retardants has been increasing in recent years.

The utilization of polyorganosiloxane compounds (also called silicones) as halogen-free and phosphorus-free flame retardants has been proposed. For example, Japanese Kokai Publication Sho-54-36365 describes that kneading of a monoorganopolysiloxane-based silicone resin with a non-silicone polymer gives a flame retardant resin.

Japanese Kohyo Publication Hei-3-48947 describes that a mixture of a silicone resin and a salt of a metal of the group IIA provides thermoplastic resins with flame retardancy.

Japanese Kokai Publication Hei-8-113712 describes a method of producing flame retardant resin compositions which comprises dispersing a silicone resin prepared by blending 100 parts by weight of a polyorganosiloxane with 10 to 150 parts by weight of a silica filler in thermoplastic resins.

Japanese Kokai Publication Hei-10-139964 describes that flame retardant resin compositions are obtained by adding a solvent-soluble silicone resin having a weight average molecular weight of not less than 10,000 but not more than 270,000 to an aromatic ring-containing non-silicone resin.

However, the silicone resins described in the above-cited publications are indeed effective in providing flame retardancy but their effects are still unsatisfactory. When the addition level is increased to fill up the shortage, a problem arises that the impact resistance of the resin composition decreases, making it difficult to obtain flame retardant resin composition balanced between flame retardancy and impact resistance.

Japanese Kokai Publication 2000-17029 describes that when a composite rubber-based flame retardant produced by graft polymerization of a vinyl monomer onto a composite rubber composed of a polyorganosiloxane rubber and a polyalkyl (meth)acrylate rubber is incorporated in thermoplastic resins, flame retardant resin compositions can be obtained.

Japanese Kokai Publication 2000-226420 describes that flame retardant resin compositions can be obtained by incorporating a polyorganosiloxane-based flame retardant produced by grafting a vinyl monomer onto composite particles consisting of an aromatic group-containing polyorganosiloxane and a vinyl polymer in thermoplastic resins.

Japanese Kokai Publication 2000-264935 describes that flame retardant resin compositions can be obtained by incorporating, in thermoplastic resins, a polyorganosiloxane-containing graft copolymer prepared by graft copolymerization of a vinyl monomer onto polyorganosiloxane particles not larger than 0.2 μm in size.

The flame retardant resin compositions described in the above-cited Japanese Kokai Publication 2000-17029, Japanese Kokai Publication 2000-226420 and Japanese Kokai Publication 2000-264935 all indeed show satisfactory levels of impact resistance but are unsatisfactory in flame retardancy. Thus, they have a problem that the flame retardancy-impact resistance balance is poor.

SUMMARY OF THE INVENTION

It is an object of the present invention to provide a polyorganosiloxane-containing graft copolymer utilizable as a halogen-free and phosphorus-free flame retardant and excellent in flame retardancy and impact resistance improving effects as well as a flame-retardant resin composition excellent in flame retardancy and impact resistance using the graft copolymer mentioned above.

The present inventors made intensive investigations concerning the above subject and, as a result, found that a specific polyorganosiloxane-containing graft copolymer is excellent in flame retardancy and impact resistance improving effects and that a flame-retardant resin composition excellent in flame retardancy and impact resistance can be obtained by incorporating the polyorganosiloxane-containing graft copolymer in a thermoplastic resin. Based on such findings, the present invention has now been completed.

Thus, in accordance with a first aspect thereof, the present invention relates to:

a polyorganosiloxane-containing graft copolymer which is obtainable by polymerizing 0.5 to 10 parts (parts by weight; hereinafter the same shall apply) of a vinyl monomer (B) comprising 100 to 50% (% by weight; hereinafter the same shall apply) of a polyfunctional monomer (b-1) containing two or more polymerizable unsaturated bonds and 0 to 50% of another copolymerizable monomer (b-2), in the presence of 40 to 90 parts of polyorganosiloxane particles (A1), followed by further polymerization of 5 to 50 parts of a vinyl monomer (C) [the sum of (A1), (B) and (C) being 100 parts] (Claim 1);

the polyorganosiloxane-containing graft copolymer according to Claim 1, wherein the polyorganosiloxane particles (A1) have a volume average particle diameter of 0.008 to 0.6 μm (Claim 2);

the polyorganosiloxane-containing graft copolymer according to Claim 1 or 2, wherein the vinyl monomer (C) gives a polymer thereof having a solubility parameter of 9.15 to 10.15 $(cal/cm^3)^{1/2}$ (Claim 3);

the polyorganosiloxane-containing graft copolymer according to any of Claims 1 to 3, wherein the polyorganosiloxane particles (A1) are in a latex form (Claim 4);

the polyorganosiloxane-containing graft copolymer according to any of Claims 1 to 4, wherein the vinyl monomer (C) comprises at least one monomer selected from the group consisting of aromatic vinyl monomers, vinyl cyanide monomers, (meth)acrylate ester monomers and carboxyl group-containing vinyl monomers (Claim 5);

a flame retardant which comprises a polyorganosiloxane-containing graft copolymer according to Claim 1 (Claim 6);

a flame retardant resin composition which comprises 0.1 to 30 parts, per 100 parts of a thermoplastic resin, of a flame retardant according to Claim 6 as incorporated in the thermoplastic resin (Claim 7); and the flame retardant resin composition according to Claim 7, wherein the thermoplastic resin is a polycarbonate resin (Claim 8).

In accordance with a second aspect thereof, the invention relates to:

a polyorganosiloxane-containing graft copolymer which is obtainable by polymerizing 0 to 10 parts by weight of a vinyl monomer (B) comprising 100 to 50% by weight of a polyfunctional monomer (b-1) containing two or more polymerizable unsaturated bonds and 0 to 50% by weight of another copolymerizable monomer (b-2), in the presence of 30 to 95 parts by weight (as solid content) of a polyorganosiloxane (A2) in a latex form obtainable by seed polymerization using, as a seed polymer, a hydrophilic polymer capable of swelling in the corresponding organosiloxane, followed by further polymerizing 5 to 70 parts by weight of a vinyl monomer (C) [the sum of (A2), (B) and (C) being 100 parts] (Claim 9);

the polyorganosiloxane-containing graft copolymer according to Claim 9, wherein the seed polymer has such a degree of hydrophilicity that the extraction rate of water-soluble components in dry seed polymer is 10 to 100% by weight, as determined after adding water, in an amount of 20 weight-times that of the seed polymer in a dry state, to the dry seed polymer, followed by stirring at 23° C. for 1 hour and wherein the seed polymer shows such a degree of swelling in the organosiloxane that the rate of swelling by volume as determined from the ratio between the latex particle diameter after stirring and the latex particle diameter before stirring is 3 to 50 times after adding the organosiloxane, in an amount 50 times by weight that of the dry seed polymer, to the seed polymer latex, followed by stirring at 23° C. for 1 hour (Claim 10);

the polyorganosiloxane-containing graft copolymer according to Claim 9, wherein the seed polymer has such a degree of hydrophilicity that the extraction rate of water-soluble components in dry seed polymer is 50 to 100% by weight, as determined after adding water, in an amount of 20 weight-times that of the seed polymer in a dry state, to the dry seed polymer, followed by stirring at 23° C. for 1 hour, and wherein the seed polymer shows such a degree of swelling in the organosiloxane that the rate of swelling by volume as determined from the ratio between the latex particle diameter after stirring and the latex particle diameter before stirring is 3 to 15 times after adding the organosiloxane, in an amount 50 weight-times that of the dry seed polymer, to the seed polymer latex, followed by stirring at 23° C. for 1 hour (Claim 11);

The polyorganosiloxane-containing graft copolymer according to any of Claims 9 to 11, wherein the vinyl monomer (C) comprises at least one monomer selected from the group consisting of aromatic vinyl monomers, vinyl cyanide monomers, (meth)acrylate ester monomers and carboxyl group-containing vinyl monomers (Claim 12);

a flame retardant which comprises the polyorganosiloxane-containing graft copolymer according to Claim 9 (Claim 13);

a resin composition excellent in impact resistance and flame retardancy which comprises a thermoplastic resin and the flame retardant according to Claim 13 as incorporated therein in an amount of 0.1 to 30 parts by weight per 100 parts by weight of the thermoplastic resin (Claim 14);

The resin composition according to Claim 14, wherein the thermoplastic resin is a polycarbonate resin (Claim 15).

DETAILED DISCLOSURE OF THE INVENTION

First Aspect of the Invention

The polyorganosiloxane-containing graft copolymer according to the first aspect of the invention is one obtainable by polymerizing 0.5 to 10 parts of a vinyl monomer (B) (hereinafter also referred to as "vinyl monomer B"), which comprises 100 to 50% of a polyfunctional monomer (b-1) (hereinafter also referred to as "polyfunctional monomer (b-1)") containing two or more polymerizable unsaturated bonds and 0 to 50% of another copolymerizable monomer (b-2) (hereinafter also referred to as "copolymerizable monomer (b-2)"), in the presence of 40 to 90 parts (as solid content) of polyorganosiloxane particles (A1), followed by further polymerization of 5 to 50 parts of a vinyl monomer (C), with the sum of (A1), (B) and (C) amounting to 100 parts.

The polyorganosiloxane particles (A1) preferably have a volume average particle diameter of not less than 0.008 μm, more preferably not less than 0.01 μm, as determined by light scattering method or electron microscopic observation. On the other hand, it is preferably not larger than 0.6 μm, more preferably not larger than 0.2 μm, most preferably not larger than 0.15 μm. It tends toward difficulty to obtain particles smaller in volume average particle diameter than 0.008 μm and, when such diameter exceeds 0.6 μm, the flame retardancy tends to deteriorate.

The coefficient of variation in the particle diameter distribution (100× standard deviation/volume average particle diameter) (%) of the polyorganosiloxane particles is desirably controlled so that it may amount preferably to 10 to 100%, more preferably to 20 to 60%, since then the moldings produced from the resin composition containing the graft copolymer according to the first aspect of the invention can have a good surface appearance.

From the flame retardancy and impact resistance viewpoint, the polyorganosiloxane particles (A1) preferably has a toluene-insoluble matter content (as determined by immersing 0.5 g of the particles in 80 ml of toluene at 23° C. for 24 hours) of not more than 95%, more preferably not more than 50%, most preferably not more than 20%.

In the first aspect of the invention, the polyorganosiloxane particles (A1) include, within the meaning thereof, not only particles made of a polyorganosiloxane(s) alone but also modified polyorganosiloxane particles containing not more than 5% of another or other (co)polymers. Thus, the polyorganosiloxane particles (A1) may contain not more than 5% of polybutyl acrylate, a butyl acrylate-styrene copolymer and/or the like therein.

As specific examples of the polyorganosiloxane particles (A1), there may be mentioned polydimethylsiloxane particles, polymethylphenylsiloxane particles, and dimethylsiloxane-diphenylsiloxane copolymer particles. These particle species may be used singly or two or more of them may be used in combination.

The polyorganosiloxane particles (A1) can be obtained, for example, by polymerizing (1) an organosiloxane, (2) a bifunctional silane compound, (3) an organosiloxane and a bifunctional silane compound, (4) an organosiloxane and a vinylic polymerizable group-containing silane compound, (5) a bifunctional silane compound and a vinylic polymerizable group-containing silane compound or (6) an organosiloxane, a bifunctional silane compound and a vinylic polymerizable group-containing silane compound, and the like, and optionally further with an at least tri functional silane compound(s). The "bifunctional silane compound" is a silane compound having a total number of two of a hydroxyl group(s) and/or a hydrolyzable group(s) each bound to a silicon atom. The "at least trifunctional silane compound" means a silane compound having a total number of at least three of a hydroxyl group(s) and/or a hydrolyzable group(s) each bound to a silicon atom.

The above-mentioned organosiloxane and bifunctional silane compound are components constituting the main skeleton of the polyorganosiloxane chain. As specific examples of the organosiloxane, there may be mentioned, among others, hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), and hexadecamethylcyclooctasiloxane (D8). As specific examples of the bifunctional silane compound, there may be mentioned diethoxydimethylsilane, dimethoxydimethylsilane, diphenyldimethoxysilane, diphenyldiethoxysilane, 3-chloropropylmethyldimethoxysilane, 3-glycidoxypropylmethyldimethoxysilane, heptadecafluorodecylmethyldimethoxysilane, trifluoropropylmethyldimethoxysilane, octadecylmethyldimethoxysilane, and the like. From the viewpoint of economical efficacy and flame retardancy, silane compounds or mixtures thereof comprising 70 to 100%, preferably 80 to 100%, of D4 or a mixture of D3 to D7 or a mixture of D3 to D8 and, as the rest, 0 to 30%, preferably 0 to 20% of diphenyldimethoxysilane, diphenyldiethoxysilane and/or the like are preferred among others.

The above-mentioned vinylic polymerizable group-containing silane compound is component for introducing a vinylic polymerizable group into side chains and/or a terminus or termini of the copolymer by copolymerization with the above-mentioned organosiloxane, bifunctional silane compound, at least trifunctional silane compound and/or the like, and such vinylic polymerizable group serves as an active site for grafting in chemical binding with a vinyl (co)polymer formed from the vinyl monomer (B) or vinyl monomer (C) mentioned later herein. Furthermore, it is a component capable of forming a crosslink between such active sites for grafting in the manner of radical reaction induced by a radical polymerization initiator and thus capable of serving also as a crosslinking agent. On that occasion, the radical polymerization initiator may be the same one as can be used in the graft polymerization to be mentioned later herein. Even when crosslinking is caused by the radical reaction, grafting is still possible since such sites partly remain as active sites for grafting.

As specific examples of the above-mentioned vinylic polymerizable group-containing silane compound, there may be mentioned, among others, γ-methacryloyloxypropyldimethoxymethylsilane, γ-methacryloyloxypropyltrimethoxysilane, γ-methacryloyloxypropyltriethoxysilane, γ-methacryloyloxypropyldiethoxymethylsilane, γ-acryloyloxypropyldimethoxymethylsilane, γ-acryloyloxypropyltrimethoxysilane and like (meth)acryloyloxy group-containing silane compounds, p-vinylphenyldimethoxymethylsilane, p-vinylphenyltrimethoxysilane and like vinylphenyl group-containing silane compounds, vinylmethyldimethoxysilane, vinyltrimethoxysilane, vinyltriethoxysilane and like vinyl group-containing silane compounds, mercaptopropyltrimethoxysilane, mercaptopropyldimethoxymethylsilane and like mercapto group-containing silane compounds. Among these, (meth)acryloyloxy group-containing silane compounds, vinyl group-containing silane compounds and mercapto group-containing silane compounds are preferred from the economical viewpoint.

In cases where the above-mentioned vinylic polymerizable group-containing silane compound is of the trialkoxysilane type, it serves also as the at least trifunctional silane compound mentioned below.

The at least trifunctional silane compound is used as a component for introducing a crosslinked structure into the polyorganosiloxane and providing the same with rubber elasticity as a result of copolymerization thereof with the above-mentioned organosiloxane, bifunctional silane compound and/or vinylic polymerizable group-containing silane compound, among others, namely as a crosslinking agent for the polyorganosiloxane. As specific examples, there may be mentioned tetraethoxysilane, methyltriethoxysilane, methyltrimethoxysilane, ethyltriethoxysilane, 3-glycidoxypropyltrimethoxysilane, heptadecafluorodecyltrimethoxysilane, trifluoropropyltrimethoxysilane, octadecyltrimethoxysilane and like tetrafunctional or trifunctional alkoxysilane compounds. Among these, tetraethoxysilane and methyltriethoxysilane are preferably used in view of the high efficiency of crosslinking attainable therewith.

In the polymerization thereof, the above-mentioned organosiloxane, bifunctional silane compound, vinylic polymerizable group-containing silane compound, and at least trifunctional silane compound are generally used in proportions such that the organosiloxane and/or bifunctional silane compound (the ratio between the organosiloxane and bifunctional silane compound generally being 100/0 to 0/100 by weight, preferably 100/0 to 70/30 by weight) amounts to 50 to 99.9%, preferably 60 to 99.5%, the vinylic polymerizable group-containing silane compound to 0 to 40%, preferably 0.5 to 30%, and the at least trifunctional silane compound to 0 to 50%, preferably 0 to 39%. The vinylic polymerizable group-containing silane compound and at least trifunctional silane compound do not simultaneously amount to 0%, and at least one of them is preferably used in an amount of not less than 0.1%.

When the proportion of the above-mentioned organosiloxane and/or bifunctional silane compound is too small, the resin compositions obtained by incorporating the resulting copolymer therein tend to become brittle. When the proportion is excessive, the amount of the vinylic polymerizable group-containing silane compound and/or at least trifunctional silane compound becomes excessively small and the effects of using these tend to be hardly produced. Furthermore, when the proportion of the above-mentioned vinylic polymerizable group-containing silane compound and/or at least trifunctional silane compound is too small, the flame retardancy-causing effect becomes unsatisfactory and, when it is excessive, the resin compositions obtained by incorporating the resulting copolymer therein tend to become brittle.

The above-mentioned polyorganosiloxane particles (A1) are preferably produced, for example, by emulsion polymerization of the polyorganosiloxane-forming components, such as the organosiloxane, bifunctional silane compound or/and vinylic polymerizable group-containing silane compound, optionally with the at least trifunctional silane compound as added according to need.

The above-mentioned emulsion polymerization may be carried out by emulsifying and dispersing the above polyorganosiloxane-forming components in water in the presence of an emulsifier by means of mechanical shearing and making the system acidic. When, in this case, emulsion droplets not smaller than several micrometers are prepared by means of mechanical shearing, the volume average particle diameter of the polyorganosiloxane particles (A1) obtained after polymerization can be controlled within the range of 0.02 to 0.6 μm by varying the amount of the emulsifier used. As for the coefficient of variation in particle diameter distribution (100× standard deviation/volume average particle diameter) (%), a value of 20 to 70% can be obtained.

For producing polyorganosiloxane particles not larger than 0.1 μm with a narrow particle diameter distribution, the polymerization is preferably carried out in a multistage manner. For example, a 1 to 20% portion of an emulsion composed of emulsion droplets not smaller than several micrometers as obtained by emulsification, under mechanical shearing, of the above-mentioned polyorganosiloxane-forming components, water and the emulsifier is subjected in advance to emulsion polymerization under acidic conditions, the remaining portion of the emulsion is added and subjected to polymerization in the presence of the polyorganosiloxane particles obtained, which serve as seeds. It is possible to control, by adjusting the emulsifier amount, in a manner such that the thus-obtained polyorganosiloxane particles may have a volume average particle diameter of 0.02 to 0.1 μm with a coefficient of variation in particle diameter distribution of 10 to 60%. According to a more preferred procedure for the multistage polymerization, the multistage polymerization is carried out in the same manner using a vinyl (co)polymer obtained by ordinary emulsion polymerization of a vinyl monomer(s) (e.g. styrene, butyl acrylate, methyl methacrylate), which is(are) used on the occasion of graft polymerization mentioned later herein, in lieu of the polyorganosiloxane particles serving as seeds, whereby it is possible to control, by adjusting the emulsifier amount, in a manner such that the polyorganosiloxane (modified polyorganosiloxane) particles obtained may have a volume average particle diameter of 0.008 to 0.1 μm with a coefficient of variation in particle diameter distribution of 10 to 50%. The above-mentioned emulsion droplets not smaller than several micrometers can be prepared by using a high-speed stirrer, for example a Homomixer.

In the above-mentioned emulsion polymerization, an emulsifier which will not lose its emulsifying ability under acidic conditions is used. As specific example, there may be mentioned alkylbenzenesulfonic acids, sodium alkylbenzenesulfonates, alkylsulfonic acids, sodium alkylsulfonates, sodium (di)alkyl sulfosuccinates, sodium polyoxyethylene nonylphenyl ether sulfonates, sodium alkylsulfates, and the like. These may be used singly or a combination of two or more may also be used. Among them, alkylbenzenesulfonic acids, sodium alkylbenzenesulfonates, alkylsulfonic acids, sodium alkylsulfonates, and sodium (di)alkyl sulfosuccinates are preferred in view of the relatively high emulsion stability of the emulsion. Particularly preferred are alkylbenzenesulfonic acids and alkylsulfonic acids, since they also serve as polymerization catalysts for the polyorganosiloxane-forming components.

The acidic condition can be obtained by adding, to the system, an inorganic acid, such as sulfuric acid or hydrochloric acid, or an organic acid, such as an alkylbenzenesulfonic acid, an alkylsulfonic acid or trifluoroacetic acid. For avoiding corrosion of the production equipment and for attaining an adequate rate of polymerization, the pH is preferably adjusted to 1 to 3, more preferably to 1.0 to 2.5.

For attaining an adequate rate of polymerization, the heating for the polymerization is carried out preferably at 60 to 120° C., more preferably 70 to 100° C.

Under such an acidic condition, the Si—O—Si bonds forming the polyorganosiloxane skeleton are in a state of equilibrium between cleavage and formation, and this equilibrium varies depending on the temperature. Therefore, for stabilizing the polyorganosiloxane chain, the system is preferably neutralized with an aqueous solution of an alkali, such as sodium hydroxide, potassium hydroxide or sodium carbonate. Furthermore, as the temperature lowers, the above equilibrium shifts to the formation side, facilitating the formation of products with a high-molecular weight and a high degree of crosslinking, so that, for obtaining polymer having high-molecular weight or high degree of crosslinking, the system after carrying out the polymerization of the polyorganosiloxane-forming components at 60° C. or above is preferably cooled to room temperature or below and, after about 5 to 100 hours of standing, it is neutralized.

The thus-obtained polyorganosiloxane particles (A1), when formed, for example, by polymerization of the organosiloxane and/or bifunctional silane compound, with or without further addition of the vinylic polymerizable group-containing silane compound, occur as a vinylic polymerizable group-containing polymer generally resulting from random copolymerization. In cases where the at least trifunctional silane compound is used in the copolymerization, the particles have a crosslinked network structure. When crosslinking is effected between vinylic polymerizable groups in the manner of radical reaction using such a radical polymerization initiator as used on the occasion of graft polymerization, which is mentioned later herein, the product has a crosslinked structure resulting from chemical bonding between vinylic polymerizable groups, with part of the vinylic polymerizable groups remaining unreacted.

Graft polymerization of the vinyl monomer (B) and vinyl monomer (C) onto the polyorganosiloxane particles (A1) gives the polyorganosiloxane-containing graft copolymer. In the polymerization of the vinyl monomer (B) and vinyl monomer (C) in the presence of the polyorganosiloxane particles, there are also produced, as byproducts, the so-called free polymer molecules resulting from polymerization of the branch components (herein polymers of the vinyl monomer (B) and vinyl monomer (C)) alone without their grafting onto the stem component (herein the polyorganosiloxane particles (A1)). The product is thus obtained as a mixture of the graft copolymer and free polymer molecules. In accordance with the first aspect of the invention, these both species are collectively referred to as the graft copolymer.

The above-mentioned graft copolymer structurally results from grafting of the vinyl monomer (B) onto the polyorganosiloxane particles (A1) and grafting of the vinyl monomer (C) not only onto the polyorganosiloxane particles (A1) but also onto the polymer molecules formed by the vinyl monomer (B), hence the free polymer content is low.

The graft copolymer preferably has an acetone-insoluble matter content (as determined by immersing 1 g of the graft copolymer in 80 ml acetone at 23° C. for 48 hours) of not less than 80%, more preferably not less than 85% in view of good flame retardant effects obtainable in such a case.

The above-mentioned vinyl monomer (B) is used for enhancing the flame retardant and impact resistance-improving effects. It comprises 100 to 50%, preferably 100 to 80%, more preferably 100 to 90%, of a polyfunctional monomer (b-1) containing two or more polymerizable unsaturated bonds and 0 to 50%, preferably 0 to 20%, more preferably 0 to 10%, of another copolymerizable monomer (b-2). When the proportion of the polyfunctional monomer (b-1) is too small, or when the copolymerizable monomer (b-2) is excessive, the graft copolymer finally obtained tends to become less effective in improving the impact resistance.

The polyfunctional monomer (b-1) is a compound containing two or more polymerizable unsaturated bonds in the molecule. As specific examples thereof, there may be mentioned allyl methacrylate, triallyl cyanurate, triallyl isocyanurate, diallyl phthalate, ethylene glycol dimethacrylate, 1,3-butylene glycol dimethacrylate, and divinylbenzene. These may be used singly or two or more of them may be used in combination. Among them, the use of allyl methacrylate, in particular, is preferred from the economical and efficacy viewpoint.

As specific examples of the copolymerizable monomer (b-2), there may be mentioned, among others, aromatic vinyl monomers such as styrene, α-methylstyrene, paramethylstyrene and parabutylstyrene, vinyl cyanide monomers such as acrylonitrile and methacrylonitrile, (meth)acrylate ester monomers such as methyl acrylate, ethyl acrylate, propyl acrylate, butyl acrylate, 2-ethylhexyl acrylate, glycidyl acrylate, hydroxyethyl acrylate, hydoxybutyl acrylate, methyl methacrylate, ethyl methacrylate, butyl methacrylate, lauryl methacrylate, glycidyl methacrylate and hydroxyethyl methacrylate, and carboxyl group-containing vinyl monomers such as itaconic acid, (meth)acrylic acid, fumaric acid and maleic acid. These may be used singly or two or more of them may be used in combination.

The above-mentioned vinyl monomer (C) is a component to be used for obtaining the polyorganosiloxane-containing graft copolymer. It is also a component to be used for securing compatibility between the graft copolymer and a thermoplastic resin to thereby disperse the graft copolymer in the thermoplastic resin uniformly for the improvements in flame retardancy and impact resistance by incorporating the graft copolymer in the thermoplastic resin. Therefore, the vinyl monomer (C) is preferably selected so that a polymer of the vinyl monomer may preferably have a solubility parameter of not less than 9.15 $(cal/cm^3)^{1/2}$, more preferably not less than 9.17 $(cal/cm^3)^{1/2}$, still more preferably not less than 9.20 $(cal/cm^3)^{1/2}$. Also preferably, it is selected so that the solubility parameter in question may be not more than 10.15 $(cal/cm^3)^{1/2}$, more preferably not more than 10.10 $(cal/cm^3)^{1/2}$, still more preferably not more than 10.05 $(cal/cm^3)^{1/2}$. When the solubility parameter is outside the above range, the flame retardancy tends to decrease.

The solubility parameter values are calculated using the small group parameters according to the group contribution method described in "Polymer Handbook", 4th edition, published by John Wiley & Sons, Inc., 1999, Section VII, pages 682-685. For example, the value for poly (methyl methacrylate) (regarding the repeating unit molecular weight as 100 g/mole, and the density as 1.19 g/cm³) is 9.25 $[(cal/cm^3)^{1/2}]$, for poly(butyl acrylate) (regarding the repeating unit molecular weight as 128 g/mole, and the density as 1.06 g/cm³) 8.97 $[(cal/cm^3)^{1/2}]$, for poly(butyl methacrylate) (regarding the repeating unit molecular weight as 142 g/mole, and the density as 1.06 g/cm³) 9.47 $[(cal/cm^3)^{1/2}]$, for polystyrene (regarding the repeating unit molecular weight as 104, and the density as 1.05 g/cm³) 9.03 $[(cal/cm^3)^{1/2}]$, and for polyacrylonitrile (regarding the repeating unit molecular weight as 53, and the density as 1.18 g/cm³) 12.71 $[(cal/cm^3)^{1/2}]$. Used as the density values for the respective polymers were those described in Ullman's Encyclopedia of Industrial Chemistry, published by VCH, 1992, volume A21, page 169. As for the solubility parameter δc of each copolymer, the value for the main component was employed when the copolymer weight fraction is less than 5% and, when that weight fraction is not less than 5%, it was supposed that the additivity rule based on the weight fractions can hold good. Thus, the solubility parameter δc can be calculated from the solubility parameters δn of respective homopolymers of m vinyl monomer species constituting the copolymer in question and weight fraction Wn of that polymer according to the following equation (1):

$$\delta c = \sum_{n=1}^{n=m} \delta n W n \bigg/ \sum_{n=1}^{n=m} W n \quad (1)$$

Thus, for example, the solubility parameter of a copolymer composed of 75% of styrene and 25% of acrylonitrile can be found to be 9.95 $[(cal/cm^3)^{1/2}]$ by using the solubility parameter 9.03 $[(cal/cm^3)^{1/2}]$ of polystyrene and the solubility parameter 12.71 $[(cal/cm^3)^{1/2}]$ of polyacrylonitrile and using the equation (1).

For the solubility parameter δs of a vinyl polymer obtained by carrying out polymerization in two or more stages while varying the vinyl monomer species in each stage, it was supposed that the additivity rule can hold good with respect to the values obtained by dividing the weights of the vinyl polymers obtained in the respective stages by the whole weight of the vinyl polymer finally obtained, namely the weight fractions. Thus, the value δs of the polymer polymerized in q stages can be calculated from the solubility parameter δi of the polymer obtained in each stage and the weight fraction Wi of that polymer according to the following equation (2):

$$\delta s = \sum_{i=1}^{i=q} \delta i W i \bigg/ \sum_{i=1}^{i=q} W i \quad (2)$$

Thus, for example, when polymerization was carried out in two stages and, in stage 1, 50 parts of a copolymer composed of 75% of styrene and 25% of acrylonitrile was obtained and, in stage 2, 50 parts of a polymer of methyl methacrylate was obtained, the solubility parameter of the polymer obtained by such two-stage polymerization can be calculated as 9.60 $[(cal/cm^3)^{1/2}]$ by using the solubility parameter value 9.95 $[(cal/cm^3)^{1/2}]$ for the 75% styrene-25% acrylonitrile copolymer and the solubility parameter value 9.25 $[(cal/cm^3)^{1/2}]$ for poly(methyl methacrylate) and using the equation (2).

The above-mentioned vinyl monomer (C) includes the same ones as mentioned hereinabove as the other copolymerizable monomer (b-2) referring to the vinyl monomer (B). These may be used singly or two or more of them may be used in combination.

The polyorganosiloxane-containing graft copolymer according to the first aspect of the invention can be obtained by polymerizing 0.5 to 10 parts (preferably not less than 1 part, more preferably not less than 2 parts, but preferably not more than 5 parts, more preferably not more than 4 parts) of the vinyl monomer (B) in the presence of 40 to 90 parts (as solid content) (preferably not less than 60 parts, but preferably not more than 80 parts, more preferably not more than 75 parts) of the above-mentioned polyorganosiloxane particles (A1) and further polymerizing 5 to 50 parts (preferably not less than 15 parts, more preferably not less than 21 parts, but preferably not more than 39 parts, more preferably not more than 38 parts) of the vinyl monomer (C) so that the total amount may become 100 parts. When the amount of the polyorganosiloxane particles (A1) is too small or too large, the flame retardant effect tends to decrease in either case. When the amount of the vinyl monomer (B) is too small, the flame retardant and impact resistance improving effects tend to decrease and, when it is excessive, the impact resistance improving effect tends to decrease. When the vinyl monomer (C) is too small or too large, the flame retardant effect tends to lower in either case.

In carrying out above graft polymerization, the technique of ordinary seed emulsion polymerization can be applied. Thus, the above-mentioned vinyl monomer (B) and vinyl monomer (C) can be subjected to radical polymerization in the presence of polyorganosiloxane particles (A1). In the radical polymerization in question, the polyorganosiloxane particles (A1) are preferably in a latex form. Namely, it is preferred that the radical polymerization should be carried out in latex of the polyorganosiloxane particles (A1). The vinyl monomer (B) and vinyl monomer (C) each may be polymerized in one stage or in two or more stages.

The above radical polymerization can be carried out by the method comprising thermally decomposing a radical polymerization initiator to thereby cause the reaction to proceed, or by the method comprising allowing the reaction to proceed in a redox system using a reducing system, for instance, without any particular restriction.

As specific examples of the radical polymerization initiator, there may be mentioned organic peroxides such as cumene hydroperoxide, tert-butyl hydroperoxide, benzoyl peroxide, tert-butyl peroxyisopropyl carbonate, di-tert-butyl peroxide, tert-butyl peroxylaurate, lauroyl peroxide, succinic acid peroxide, cyclohexanone peroxide, and acetylacetone peroxide, inorganic peroxides such as potassium persulfate and ammonium persulfate, and azo compounds such as 2,2'-azobisisobutyronitrile and 2,2'-azobis-2,4-dimethylvaleronitrile, among others. Among these, organic peroxides and inorganic peroxides are particularly preferred because of their high reactivity.

As the reducing agent to be used in the above-mentioned redox system, there may be mentioned such mixture as iron (II) sulfate/glucose/sodium pyrophosphate, iron(II) sulfate/dextrose/sodium pyrophosphate, and iron(II) sulfate/sodium formaldehyde sulfoxylate/ethylenediamine acetate, for instance.

The above-mentioned radical polymerization initiator is used generally in an amount of 0.005 to 20 parts, preferably 0.01 to 10 parts, most preferably 0.04 to 5 parts, per 100 parts of the sum total of the vinyl monomer (B) and/or vinyl monomer (C) used or, in the case of multi-stage polymerization, per 100 parts of the monomer(s) used in each stage. In multi-stage polymerization, the radical polymerization initiator and the amount thereof each may be the same or different in each stage. When the amount of the radical polymerization initiator is too small, the rate of reaction is low and, accordingly, the production efficiency tends to worsen. When it is excessive, the generation of heat during reaction tends to become intensive, making it difficult to produce the desired graft copolymer.

A chain transfer agent may also be used where necessary in carrying out the radical polymerization. The chain transfer agent may be any of those generally used in emulsion polymerization, without any particular limitation.

As specific examples of the chain transfer agent, there may be mentioned tert-dodecylmercaptan, n-octylmercaptan, n-tetradecylmercaptan, and n-hexylmercaptan, among others.

Although it is an optional component, the chain transfer agent is used preferably in an amount of 0.01 to 5 parts per 100 parts of the sum of the vinyl monomer (B) and/or vinyl monomer (C) employed. In multi-stage polymerization, it is used preferably in an amount of 0.01 to 5 parts per 100 parts of the monomer(s) used in each stage. In multi-stage polymerization, the chain transfer agents and the addition levels thereof in the respective steps may be the same or different. When the amount of the chain transfer agent is smaller than 0.01 parts, no significant effect can be obtained and, when it exceeds 5 parts, the rate of polymerization slows down, hence the production efficiency tends to decrease.

Generally, it is preferred that the reaction temperature be 30 to 120° C.

When, in the above polymerization, the polyorganosiloxane particles (A1) contain vinylic polymerizable groups, the vinyl monomer (B), on the occasion of polymerization thereof by means of the radical polymerization initiator, reacts with the vinylic polymerizable groups of the polyorganosiloxane particles (A1) to form grafts. When the polyorganosiloxane particles (A1) have no vinylic polymerizable group, a specific radical initiator, for example tert-butyl peroxylaurate, is used to extract hydrogen atoms from organic groups such as methyl groups each bonded to a silicon atom. Then, the vinyl monomer (B) is polymerized by the resulting radicals to form grafts. Furthermore, when the vinyl monomer (C) is polymerized by a radical polymerization initiator, it reacts not only with the polyorganosiloxane particles (A1), like the vinyl monomer (B), but also with the unsaturated bonds occurring in the polymer molecules formed by the vinyl monomer (B) to give grafts resulting from the vinyl monomer (C).

The graft copolymer produced by emulsion polymerization may be separated from the latex for use thereof, or may be used in the latex form. The method of recovering the polymer from the latex may be any of conventional methods. For example, mention may be made of the method comprising adding a metal salt, such as calcium chloride, magnesium chloride or magnesium sulfate, to the latex to cause the latex to coagulate, followed by separation, washing with water, dehydrating and drying. The spray drying method may also be used.

The thus-obtained graft copolymer is incorporated in various thermoplastic resins to give flame-retardant resin compositions excellent in flame retardancy and impact resistance.

Preferred as the thermoplastic resins are polycarbonate resins whose polycarbonate content is not less than 50%, more preferably not less than 70%, since good flame retardancy can be obtained with them. Specific examples of the thermoplastic resins, which are preferred from the economical viewpoint and in view of good balance between flame retardancy and impact resistance, are polycarbonates (in particular aromatic polycarbonates), polycarbonate/polyester blend resins such as polycarbonate/polyethylene terephthalate blend resins and polycarbonate/polybutylene terephthalate blend resins, polycarbonate/acrylonitrile-styrene copolymer blend resins, polycarbonate/butadiene-styrene copolymer (HIPS resin) blend resins, polycarbonate/acrylonitrile-butadiene rubber-styrene copolymer (ABS resin)

blend resins, polycarbonate/acrylonitrile-butadiene rubber-α-methylstyrene copolymer blend resins, polycarbonate/styrene-butadiene rubber-acrylonitrile-N-phenylmaleimide copolymer blend resins, and polycarbonate/acrylonitrile-acrylic rubber-styrene copolymer (AAS resin) blend resins. Mixtures of two or more blend resins may also be used.

The level of addition of the above-mentioned polyorganosiloxane-containing graft copolymer to such a thermoplastic resin is preferably 0.1 to 30 parts per 100 parts of the thermoplastic resin since the flame retardancy, impact resistance and economical efficacy can obtained are good. More preferably, the addition level is not less than 0.5 parts, still more preferably not less than 1 part. It is more preferably not more than 15 parts, still more preferably not more than 5 parts.

The powder-form flame retardant comprising the polyorganosiloxane-containing graft copolymer separated from the latex can be admixed with the thermoplastic resins by mixing using a Henschel mixer or ribbon blender, for instance, followed by melting and kneading using a roll, extruder or kneader, for instance.

On that occasion, one or more of additives in general use, namely antioxidants, dripping-preventing agents, polymer processing auxiliaries, flame retardants, impact resistance improver, plasticizers, lubricants, ultraviolet absorbers, pigments, glass fibers, fillers, polymer lubricants and so forth, may be incorporated in the resin compositions.

As specific examples of the antioxidants, there may be mentioned, among others, phenolic antioxidants such as tris[N-(3,5-di-tert-butyl-4-hydroxybenzyl)]isocyanurate (e.g. ADEKA STAB AO-20, product of ASAHI DENKA), tetrakis[3-(3,5-di-tert-butyl-4-hydroxyphenyl)propionyloxy-methyl]methane (e.g. IRGANOX 1010, product of Ciba Specialty Chemicals), butylidene-1,1-bis(2-methyl-4-hydroxy-5-tert-butylphenyl) (e.g. ADEKA STAB AO-40, product of ASAHI DENKA) and 1,1,3-tris(2-methyl-4-hydroxy-5-tert-butylphenyl)butane (e.g. Yoshinox 930, product of Yoshitomi Fine Chemicals), phosphorus-containing antioxidants such as bis(2,6-di-tert-butyl-4-methylphenyl) pentaerythritol phosphite (e.g. ADEKA STAB PEP-36, product of ASAHI DENKA), tris(2,4-di-tert-butylphenyl) phosphite (e.g. ADEKA STAB 2112, product of ASAHI DENKA) and 2,2-methylenebis(4,6-di-tert-butylphenyl) octyl phosphite (e.g. ADEKA STAB HP-10, product of ASAHI DENKA), and sulfur-containing antioxidants such as dilauryl 3,3'-thio-dipropionate (Yoshinox DLTP, product of Yoshitomi Fine Chemicals) and dimyristyl 3,3'-thio-dipropionate (Yoshinox DMTP, product of Yoshitomi Fine Chemicals). Among these, phosphorus-containing antioxidants are particularly preferred since they provide improved flame retardancy.

As examples of the dripping-preventing agents, which are preferred in view of their high dripping-preventing effect, there may be mentioned fluorinated polyolefin resins such as polymonofluoroethylene, polydifluoroethylene, polytrifluoroethylene, polytetrafluoroethylene and tetrafluoroethylene/hexafluoroethylene copolymers, and poly(vinylidene fluoride) resins.

As specific examples of the polymer processing auxiliaries, there may be mentioned, among others, methyl methacrylate-butyl acrylate copolymers and like methacrylate (co) polymers.

As specific examples of the impact resistance improvers, there may be mentioned, among others, butadiene rubber type impact resistance improvers (MBS resins), butyl acrylate rubber type impact resistance improvers, and butyl acrylate rubber/silicone rubber and like composite rubber type impact resistance improvers.

One or more of other flame retardants may also be used in combination. As specific examples of the flame retardants to be used in combination, which are preferred from the fact that they are halogen-free and phosphorus-free, there may be mentioned, among others, silicone compounds such as aromatic group-containing polyorganosiloxanes, triazine compounds such as cyanuric acid and melamine cyanurate, and boron compounds such as boron oxide and zinc borate. The combined use with a phosphorus-containing compound such as triphenyl phosphate, condensed phosphate esters or stabilized red phosphorus is also possible. In this case, the use of the polyorganosiloxane-containing graft copolymer according to the first aspect of the invention in compositions containing a phosphorus-containing flame retardant is advantageous in that the amount of the phosphorus-containing flame retardant can be reduced thereby.

From the effect-cost balance viewpoint, the level of addition of these additives is preferably 0.1 to 20 parts, more preferably 0.2 to 10 parts, and most preferably 0.3 to 5 parts, per 100 parts of each thermoplastic resin.

The flame retardant resin composition obtained can be molded by applying those molding methods used in molding conventional thermoplastic resin compositions, namely injection molding, extrusion molding, blow molding, calender molding and so forth.

The fields of application of the moldings obtained from the flame retardant resin composition according to the first aspect of the invention are not particularly restricted but include those fields where flame retardancy is required, for example housings and chassis parts of various OA/information/household electric/electronic appliances such as desktop computers, notebook computers, tower type computers, server computers, printers, copiers, fax machines, cellular phones, PHS phones, televisions and video recorders, various building parts and various automotive parts.

The moldings obtained show excellent impact resistance and flame retardancy.

Second Aspect of the Invention

The polyorganosiloxane-containing graft copolymer according to the second aspect of the invention is obtainable by polymerizing 0 to 10 parts of a vinyl monomer (B) comprising 100 to 50% of a polyfunctional monomer (b-1) containing two or more polymerizable unsaturated bonds and 0 to 50% of another copolymerizable monomer (b-2), in the presence of 30 to 95 parts of a polyorganosiloxane (A2) in a latex form obtainable by seed polymerization using, as a seed polymer, a hydrophilic polymer capable of swelling in the corresponding organosiloxane (such polyorganosiloxane is hereinafter referred to also as "polyorganosiloxane (A2)"), followed by further polymerization of 5 to 70 parts of a vinyl monomer (C) [the sum of (A2), (B) and (C) being 100 parts].

The seed polymer to be used in accordance with the second aspect of invention can be obtained by ordinary emulsion polymerization but the method of synthesis is not particularly restricted. The seed polymer is not limited to such a rubber component as butyl acrylate rubber or butadiene rubber. Thus, a hard polymer such as a butyl acrylate-styrene copolymer, butyl acrylate-butadiene copolymer, butyl acrylate-acrylonitrile copolymer, butyl acrylate-styrene-acrylonitrile copolymer or styrene-acrylonitrile copolymer may also be used without any substantial trouble. However, the seed polymer is required to be capable of sufficiently swelling in the monomer(s) forming a rubber in the next stage and have strong hydrophilicity so that it may take up water into particles thereof.

As a method for improving the hydrophilicity of seed polymer, lowering the glass transition point of the seed polymer may be mentioned. The glass transition point is preferably not higher than −10° C. The glass transition point can be determined, by measuring temperature variation of specific gravity of a polymer, as the temperature at which the specific gravity is drastically varied.

For improving the ability of the seed polymer to swell in the organosiloxane, it is first important that the polarity or the like property of the seed polymer is adapted to the organosiloxane. Secondly, it is effective to markedly reduce the molecular weight of the seed polymer by selecting the use of a chain transfer agent, applying a high polymerization temperature and/or use of the initiator in a large amount. A number average molecular weight of the seed polymer is preferably not more than 10,000, more preferably 7,000. The number average molecular weight may be determined by GPC analysis (relative to polystyrene standard).

The "organosiloxane", associated with the swelling capacity of the seed polymer, is an organosiloxane which is a monomer component of a polyorganosiloxane (A2). For example, when a polyorganosiloxane (A2) is produced from octamethylcyclotetrasiloxane, the above "organosiloxane" corresponds to octamethylcyclotetrasiloxane.

The hydrophilicity of the seed polymer can be determined by adding water, in an amount of 20 times (by weight) that of the seed polymer in a dry state, to the dry seed polymer, stirring the mixture at 23° C. for 1 hour, and measuring the extraction rate of the polymer into water. When the value is not less than 1%, the hydrophilicity is sufficient. Preferably, however, the value is not less than 10%, more preferably not less than 50%. The upper limit may be at a level not more than 100%.

The swelling capacity of the seed polymer to the organosiloxane can be determined by adding the organosiloxane, in an amount 50 times (by weight) that of the dry seed polymer, to the seed polymer latex, stirring the mixture at 23° C. for 1 hour, and determining the rate of swelling by volume from the ratio between the latex particle diameter after stirring and the latex particle diameter before stirring. A value not less than 1.5 times is sufficient. Preferably, however, it is not less than 3. The upper limit is preferably set at a level not higher than 50 times, more preferably not higher than 15 times.

Marked flame retardancy and impact resistance improving effects can be obtained within the above-mentioned ranges.

The volume average particle diameter of the polyorganosiloxane (A2) in a latex form can be determined by light scattering method or electron microscopic observation, and a preferred range is 0.008 to 0.6 μm. More preferably, it is not less than 0.01 μm. As for the upper limit, the diameter is more preferably not greater than 0.2 μm. Those particles smaller than 0.008 μm in volume average particle diameter tend to become difficult to produce. When the particles are greater than 0.6 μm, the flame retardancy and impact resistance tend to decrease.

In accordance with the second aspect of the invention, the polyorganosiloxane (A2) includes, within the meaning thereof, not only simple polyorganosiloxanes but also modified polyorganosiloxanes containing not more than 5% of another or other (co)polymers. Thus, the polyorganosiloxane (A2) may contain up to 5% of poly(butyl acrylate) and/or a butyl acrylate-styrene copolymer, for instance.

As specific examples of the polyorganosiloxane (A2), there may be mentioned polydimethylsiloxane particles, polymethylphenylsiloxane particles, dimethylsiloxane-diphenylsiloxane copolymer particles, and the like. These may be used singly or two or more of them may be used in combination.

The above polyorganosiloxane (A2) can be prepared, for example, by polymerizing (1) an organosiloxane, (2) a bifunctional silane compound, (3) an organosiloxane and a bifunctional silane compound, (4) an organosiloxane and a vinylic polymerizable group-containing silane compound, (5) a bifunctional silane compound and a vinylic polymerizable group-containing silane compound, or (6) an organosiloxane, a bifunctional silane compound and a vinylic polymerizable group-containing silane compound, optionally further together with an at least trifunctional silane compound. As these compounds, those specific examples mentioned hereinabove referring to the first aspect of the invention may be mentioned. The proportions thereof are also the same as mentioned hereinabove referring to the first aspect of the invention.

The polyorganosiloxane (A2) is preferably produced by subjecting, to emulsion polymerization in the presence of the above-mentioned seed polymer, a polyorganosiloxane-forming composition comprising, for example, the organosiloxane, bifunctional silane compound, vinylic polymerizable group-containing silane compound and/or the like, optionally together with the at least trifunctional silane compound. The method of production is the same as mentioned above referring to the first aspect of the invention.

The above-mentioned vinyl monomer (B) is used for enhancing the flame retardant and impact resistance-improving effects. It comprises 100 to 50%, preferably 100 to 80%, of a polyfunctional monomer (b-1) containing two or more polymerizable unsaturated bonds and 0 to 50%, preferably 0 to 20%, of another copolymerizable monomer (b-2). When the proportion of the polyfunctional monomer (b-1) is too small, or when the amount of the copolymerizable monomer (b-2) is excessive, the graft copolymer finally obtained tends to become less effective in improving the impact resistance. As examples of the polyfunctional monomer (b-1) and of the copolymerizable monomer (b-2), there may be mentioned the same ones as mentioned hereinabove referring to the first aspect of the invention.

The above-mentioned vinyl monomer (C) is a component to be used for obtaining the polyorganosiloxane-containing graft copolymer. It is also a component to be used for securing compatibility between the graft copolymer and a thermoplastic resin to thereby disperse the graft copolymer in the thermoplastic resin uniformly for the improvements in flame retardancy and impact resistance by incorporating the graft copolymer in the thermoplastic resin. As specific monomers, there may be mentioned the same ones as mentioned above as the other copolymerizable monomers (b-2) included in the vinyl monomer (B).

The polyorganosiloxane-containing graft copolymer according to the second aspect of the invention can be obtained by polymerizing 0 to 10 parts (preferably not less than 1 part, more preferably not less than 2 parts, but preferably not more than 5 parts, more preferably not more than 4 parts) of the vinyl monomer (B) in the presence of 30 to 95 parts (as solid content) (preferably not less than 60 parts, but preferably not more than 80 parts, more preferably not more than 75 parts) of the above-mentioned polyorganosiloxane (A2) and further polymerizing 5 to 70 parts (preferably not less than 15 parts, more preferably not less than 21 parts, but preferably not more than 39 parts, more preferably not more than 38 parts) of the vinyl monomer (C) so that the total amount may become 100 parts. When the amount of the polyorganosiloxane (A2) is too small or too large, the flame retardant effect tends to decrease in either case. When the amount of the vinyl monomer (B) is too small, the flame retardant and impact resistance improving effects tend to decrease and, when it is excessive, the impact resistance improving effect tends to decrease. When the amount of the vinyl monomer (C) is too small or too large, the flame retardant effect tends to lower in either case.

The graft copolymerization can be carried out in the same manner as described hereinabove referring to the first aspect of the invention.

As the method of recovering the polymer from the graft copolymer latex obtained by emulsion polymerization, there may be mentioned, for example, the method comprising adding a metal salt, such as calcium chloride, magnesium chloride or magnesium sulfate, to the latex to cause the latex to coagulate, followed by separation, washing with water, dehydrating and drying. The spray drying method may also be used.

The thus-obtained graft copolymer is incorporated in various thermoplastic resins to give flame-retardant resin compositions excellent in flame retardancy and impact resistance. As examples of the thermoplastic resins, there may be mentioned the same ones as mentioned hereinabove referring to the first aspect of the invention.

The level of addition of the above-mentioned polyorganosiloxane-containing graft copolymer to such a thermoplastic resin is preferably 0.1 to 30 parts per 100 parts of the thermoplastic resin from the good flame retardancy and impact resistance viewpoint. More preferably, the addition level is not less than 0.5 parts, still more preferably not less than 1 part. It is more preferably not more than 15 parts, still more preferably not more than 5 parts.

The powder-form flame retardant comprising the polyorganosiloxane-containing graft copolymer separated from the latex can be admixed with the thermoplastic resins by mixing using a Henschel mixer or ribbon blender, for instance, followed by melting and kneading using a roll, extruder or kneader, for instance.

On that occasion, one or more of additives in general use, namely antioxidants, dripping-preventing agents, polymer processing auxiliaries, flame retardants, impact resistance improver, plasticizers, lubricants, ultraviolet absorbers, pigments, glass fibers, fillers, polymer lubricants and so forth, may be incorporated in the resin compositions. Specifically, those examples mentioned hereinabove referring to the first aspect of the invention may be mentioned.

The flame retardant resin composition obtained can be molded by applying those molding methods used in molding conventional thermoplastic resin compositions, namely injection molding, extrusion molding, blow molding, calender molding and so forth.

The fields of application of the moldings obtained from the flame retardant resin composition according to the second aspect of the invention are not particularly restricted but include those fields mentioned hereinabove referring to the first aspect of the invention.

The moldings obtained show excellent impact resistance and flame retardancy.

BEST MODES FOR CARRYING OUT THE INVENTION

The following examples illustrate the invention more specifically. They are, however, by no means limitative of the scope of the invention. In the following examples and comparative example, the measurements and tests were carried out as follows.

[Degree of Conversion in Polymerization]

The latex was dried in a hot air drying chamber at 120° C. for 1 hour, the remaining solid matter was weighed, and the degree of conversion was calculated according to the formula: 100× solid matter weight/charged monomer weight (%).

[Toluene-Insoluble Matter Content]

A 0.5-g portion of the polyorganosiloxane particles recovered from the latex by drying was immersed in 80 ml of toluene at 23° C. for 24 hours and, after 60 minutes of centrifugation at 12,000 rpm, the weight fraction (%) of the toluene-insoluble matter in the polyorganosiloxane particles was determined.

[Acetone-insoluble Matter Content]

One gram of the graft copolymer was immersed in 80 ml of acetone at 23° C. for 48 hours. Then, after 10 minutes of centrifugation at 18,000 rpm, the sediment was weighed, and the acetone-insoluble matter content (%) was calculated.

[Volume Average Particle Diameter]

The volume average particle diameters of the seed polymer, polyorganosiloxane particles and graft copolymer were determined each in a latex form. Using LEED & NORTHRUP INSTRUMENTS' MICROTRAC UPA as the measuring apparatus, the volume average particle diameter (μm) and the coefficient of variation in particle diameter distribution (standard deviation/volume average particle diameter (%)) were measured by the light scattering method.

[Impact Resistance]

The evaluation was made by carrying out the Izod type test at −10° C. or 23° C. using notched ⅛ inch bars according to ASTM D 256.

[Flame Retardancy]

The evaluation was made by carrying out the test V according to UL 94.

[Hydrophilicity]

Latex of seed polymer was weighed out in a beaker in such an amount that solid content of the seed polymer was about 5 g. The latex was completely dried in a drier at 120° C., and was weighed precisely. A 100 g portion of water was added to the dry seed polymer, stirred, with a stirrer, at 23° C. for 1 hour, and then filtered through filter paper. The filtrate was dried in a drier at 120° C. to recover water-soluble matters, and then the water-soluble matters were weighed precisely. The extraction rate of the water-soluble matters in dry seed polymer was calculated.

[Swelling Capacity]

The particle diameter of the seed polymer in a latex form was measured by MICROTRAC UPA. A emulsified liquid obtained by mixing organosiloxane (octamethylcyclotetrasiloxane), in an amount of 50 times (by weight) that of the seed polymer in a dry state, and 0.1% (by weight) aqueous solution of Emal 2F (product of Kao) was incorporated into 5% (by weight) latex of the seed polymer and mixed. After one-hour stirring at 23° C., particle diameters were measured by MICROTRAC UPA. The rate of swelling by volume was calculated by the following equation;

$$(\text{The rate of swelling by volume}) = \left\{ \frac{\text{(Particle diameter after swelling measured in latex)}}{\text{(Particle diameter before swelling measured in latex)}} \right\}^3 - 1$$

First Aspect of the Invention

REFERENCE EXAMPLE 1

Production of Polyorganosiloxane Particles (S-1)

An emulsion was prepared by stirring an aqueous solution composed of the following components at 10,000 rpm for 5 minutes using a Homomixer.

| Component | Amount (parts) |
|---|---|
| Pure water | 251 |
| Sodium dodecylbenzenesulfonate (SDBS) | 1.0 |
| Octamethylcyclotetrasiloxane (D4) | 95 |
| Mercaptopropyldimethoxymethylsilane (MPDS) | 5 |

A 5-necked flask equipped with a stirrer, reflux condenser, nitrogen inlet, inlet for adding monomer and thermometer was charged with the above emulsion all at once. With stirring the system, a 10% aqueous solution of dodecylbenzenesulfonic acid (DBSA) (1 part as solid content) was added, and the temperature was raised to 80° C. over about 40 minutes, and the reaction was allowed to proceed at 80° C. for 6 hours. Then, the mixture was cooled to 25° C. and, after 20 hours of standing, the pH of the system was returned to 6.5 with sodium hydroxide to terminate the polymerization. Latex containing polyorganosiloxane particles (S-1) was thus obtained. The degree of conversion, and the volume average particle diameter and toluene-insoluble matter content of the polyorganosiloxane particle latex were determined. The results are shown in Table 1.

REFERENCE EXAMPLE 2

Production of Polyorganosiloxane Particles (S-2)

A 5-necked flask equipped with a stirrer, reflux condenser, nitrogen inlet, inlet for adding monomer and thermometer was charged with the following components.

| Component | Amount (parts) |
|---|---|
| Pure water | 189 |
| SDBS | 1.2 |

Then, while substituting the system atmosphere with nitrogen, the temperature was raised to 70° C. and an aqueous solution composed of 1 part of pure water and 0.02 parts of potassium persulfate (KPS) was added. Then, a mixture composed of

| Component | Amount (parts) |
|---|---|
| Styrene (St) | 0.7 |
| Butyl methacrylate (BMA) | 1.3 | was added all at once, and the polymerization was driven to completion by stirring for 1 hour to give an St-BMA copolymer latex. The degree of conversion in polymerization was 99%. The solid content of the latex obtained was 1.0%, and the volume average particle diameter was 0.01 μm. This time, the coefficient of variation was 38%. The solvent-insoluble matter content of the St-BMA copolymer was 0%.

Separately, a mixture composed of the following components was stirred with Homomixer at 10,000 rpm for 5 minutes to give an emulsion of the polyorganosiloxane-forming components.

| Component | Amount (parts) |
|---|---|
| Pure water | 70 |
| SDBS | 0.5 |
| D4 | 95 |
| γ-Methacryloyloxypropyldimethoxymethylsilane | 3 |

Then, the St-BMA copolymer-containing latex was maintained at 80° C., a 10% aqueous solution of DBSA (2 parts as solid content) was added to the system, the emulsion of the polyorganosiloxane-forming components mentioned above was then added all at once and, after 6 hours of continued stirring, the system was cooled to 25° C. and allowed to stand for 20 hours. Thereafter, the pH was adjusted to 6.4 with sodium hydroxide to terminate the polymerization. A latex containing polyorganosiloxane particles (S-2) was obtained. The degree of conversion in polymerization, and the volume average particle diameter and toluene-insoluble matter content of the polyorganosiloxane particle latex were determined. The results are shown in Table 1. As is estimable from the charge amounts and degree of conversion, the polyorganosiloxane particles in the polyorganosiloxane particle latex is composed of 98% of the polyorganosiloxane component and 2% of the St-BMA copolymer component.

TABLE 1

| | Reference Example 1 | Reference Example 2 |
|---|---|---|
| Polyorganosiloxane particles | S-1 | S-2 |
| Degree of conversion of polyorganosiloxane component (%) | 87 | 87 |
| Average particle diameter (μm) | 0.14 | 0.04 |
| Coefficient of variation (%) | 35 | 35 |
| Toluene-insoluble matter content (%) | 0 | 0 |

EXAMPLES 1 TO 5 AND COMPARATIVE EXAMPLES 1 TO 4

A 5-necked flask equipped with a stirrer, reflux condenser, nitrogen inlet, inlet for adding monomer and thermometer was charged with 300 parts of pure water, 0.2 parts of sodium formaldehyde sulfoxylate (SFS), 0.01 parts of ethylenediaminetetraacetic acid disodium salts (EDTA), 0.0025 parts of iron(II) sulfate, and an amount specified in Table 2 of the polyorganosiloxane particles (A1). While stirring the system, the temperature was raised to 60° C. in a nitrogen atmosphere. After arrival at 60° C., a mixture of the monomer(s) (B) and radical polymerization initiator each specified in Table 2 each in an amount specified in Table 2 was added all at once, and the system was stirred at 60° C. for 1 hour. Then, the monomer (C) specified in Table 2 was added dropwise over 3 hours and, after completion of the addition, the whole mixture was further stirred for 1 hour to give a graft copolymer in a latex form.

The latex was then diluted with pure water to a solid concentration of 15%, a 10% aqueous solution of calcium chloride (2 parts as solid content) was added, whereby coagulated slurry was obtained. The coagulated slurry was heated to 80°

C., then cooled to 50° C., and dehydrated and dried to give a polyorganosiloxane-based graft copolymer (any of SG-1 to SG-5 and SG'-1 to SG'-4) in a powder form. The degree of conversion in polymerization, volume average particle diameter and acetone-insoluble matter content for each copolymer are shown in Table 2.

In Table 2, AlMA stands for allyl methacrylate, BA for butyl acrylate, MMA for methyl methacrylate, AN for acrylonitrile (they are all monomers), CHP for cumene hydroperoxide (radical polymerization initiator), and Polymer SP for solubility parameter of polymer of vinyl monomer(s) (C) (as determined by the method described herein).

any of Examples 1 to 5 (SG-1 to SG-5) or the polyorganosiloxane-based graft copolymer obtained in any of Comparative Examples 1 to 4 (SG'-1 to SG'-4) were blended together according to the formulation shown in Table 3. The abbreviation PEP36 stands for a phosphorus-containing antioxidant (ADEKA STAB PEP36, product of ASAHI DENKA), and PTFE for polytetrafluoroethylene (Polyflon FA-500, product of DAIKIN Industries).

Pellets were produced by melting and kneading each compound at 270° C. on a twin-screw extruder (TEX 44 SS, product of Japan Steel Works). The pellets obtained were

TABLE 2

|  |  | Examples | | | | | Comparative Examples | | | |
|---|---|---|---|---|---|---|---|---|---|---|
|  |  | 1 | 2 | 3 | 4 | 5 | 1 | 2 | 3 | 4 |
| Polyorganosiloxane particles (A1) (parts) (solid content) | S-1 | 70 | 70 | 70 | 70 | — | 70 | 70 | 70 | — |
|  | S-2 | — | — | — | — | 60 | — | — | — | 60 |
| Vinyl monomer (B) (parts) | AlMA | 3 | 2 | 1 | 3 | 3 | — | 1 | 15 | — |
|  | BA | — | — | — | 0.5 | — | — | 2 | — | — |
|  | CHP | 0.01 | 0.01 | 0.01 | 0.01 | 0.01 | — | 0.01 | 0.03 | — |
| Vinyl monomer (C) (parts) | MMA | 27 | 28 | 29 | 27 | — | 30 | 27 | 15 | — |
|  | St | — | — | — | — | 27.75 | — | — | — | 30 |
|  | AN | — | — | — | — | 9.25 | — | — | — | 10 |
|  | CHP | 0.06 | 0.06 | 0.06 | 0.06 | 0.08 | 0.06 | 0.06 | 0.06 | 0.08 |
| Polymer SP $((cal/cm^3)^{1/2})$ | (C) | 9.25 | 9.25 | 9.25 | 9.25 | 9.95 | 9.25 | 9.25 | 9.25 | 9.95 |
| Degree of conversion (%) | (B) | 99 | 99 | 99 | 99 | 99 | — | 99 | 99 | — |
|  | (C) | 99 | 99 | 99 | 99 | 99 | 99 | 99 | 99 | 99 |
| Acetone-insoluble matter content (%) |  | 88 | 85 | 80 | 88 | 85 | 45 | 80 | 92 | 40 |
| Graft polymer No. |  | SG-1 | SG-2 | SG-3 | SG-4 | SG-5 | SG'-1 | SG'-2 | SG'-3 | SG'-4 |

EXAMPLES 6 TO 11 AND COMPARATIVE EXAMPLES 5 TO 11

Rendering Polycarbonate Resins Flame-retardant

A polycarbonate resin (PC-1: Toughlon FN 2200A, product of IDEMITSU PETROCHEMICAL; or PC-2: Toughlon FN 1900A, product of IDEMITSU PETROCHEMICAL) and the polyorganosiloxane-based graft copolymer obtained in molded into ⅛ inch test specimens for impact resistance evaluation and 1/16 inch specimens for flame retardancy evaluation using FANUC's FAS 100 B injection molding machine set at a cylinder temperature of 280° C. The test specimens obtained were evaluated by the evaluation methods described hereinabove.

The results are shown in Table 3.

TABLE 3

|  |  | Examples | | | | | | Comparative Examples | | | | | | |
|---|---|---|---|---|---|---|---|---|---|---|---|---|---|---|
|  |  | 6 | 7 | 8 | 9 | 10 | 11 | 5 | 6 | 7 | 8 | 9 | 10 | 11 |
| Thermoplastic resin | PC-1 | 100 | 100 | 100 | 100 | 100 | — | 100 | 100 | 100 | 100 | — | 100 | — |
|  | PC-2 | — | — | — | — | — | 100 | — | — | — | — | 100 | — | 100 |
| Graft copolymer | SG-1 | 3 | — | — | — | — | 3 | — | — | — | — | — | — | — |
|  | SG-2 | — | 3 | — | — | — | — | — | — | — | — | — | — | — |
|  | SG-3 | — | — | 3 | — | — | — | — | — | — | — | — | — | — |
|  | SG-4 | — | — | — | 3 | — | — | — | — | — | — | — | — | — |
|  | SG-5 | — | — | — | — | 3 | — | — | — | — | — | — | — | — |
|  | SG'-1 | — | — | — | — | — | — | 3 | — | — | — | — | — | — |
|  | SG'-2 | — | — | — | — | — | — | — | 3 | — | — | — | — | — |
|  | SG'-3 | — | — | — | — | — | — | — | — | 3 | — | — | — | — |
|  | SG'-4 | — | — | — | — | — | — | — | — | — | 3 | 3 | — | — |
| Antioxidant | PEP36 | 0.3 | 0.3 | 0.3 | 0.3 | 0.3 | 0.3 | 0.3 | 0.3 | 0.3 | 0.3 | 0.3 | 0.3 | 0.3 |
| Dripping-preventing agent | PTFE | 0.5 | 0.5 | 0.5 | 0.5 | 0.5 | 0.5 | 0.5 | 0.5 | 0.5 | 0.5 | 0.5 | 0.5 | 0.5 |
| Flame retardancy | Total combustion time (sec) | 20 | 30 | 40 | 25 | 20 | 25 | 55 | 60 | 40 | 55 | 60 | 140 | 160 |
|  | Dripping | No | No | No | No | No | No | No | No | No | No | No | Yes | Yes |

TABLE 3-continued

| | | Examples | | | | | | Comparative Examples | | | | | | |
|---|---|---|---|---|---|---|---|---|---|---|---|---|---|---|
| | | 6 | 7 | 8 | 9 | 10 | 11 | 5 | 6 | 7 | 8 | 9 | 10 | 11 |
| Impact resistance | −10° C. (kJ/m$^2$) | 55 | 60 | 65 | 60 | 55 | 35 | 45 | 60 | 20 | 40 | 20 | 20 | 15 |

From Table 3, it is seen that the graft copolymer according to the first aspect of the invention can highly improve the flame retardancy-impact resistance balance of the polycarbonate resins.

EXAMPLE 12 AND COMPARATIVE EXAMPLES 12 AND 13

Rendering a Polycarbonate/polyethylene Terephthalate Mixed Resin Flame-retardant PC-1, a polyethylene terephthalate resin (PET: BELLPET EFG-70, product of Kanebo Gohsen) and the polyorganosiloxane-based graft copolymer (SG-1) obtained in Example 1 or the polyorganosiloxane-based graft copolymer (SG'-1) obtained in Comparative Example 1 were blended together according to the formulation shown in Table 4.

Pellets were produced by melting and kneading each compound at 270° C. on a twin-screw extruder (TEX 44 SS, product of Japan Steel Works). The pellets obtained were molded into ⅛ inch test specimens for impact resistance evaluation and 1/12 inch specimens for flame retardancy evaluation using FANUC's FAS 100 B injection molding machine set at a cylinder temperature of 260° C. The test specimens obtained were evaluated by the evaluation methods described hereinabove.

The results are shown in Table 4.

TABLE 4

| | | Example 12 | Comparative Example 12 | Comparative Example 13 |
|---|---|---|---|---|
| Thermoplastic resin | PC-1 | 90 | 90 | 90 |
| | PET | 10 | 10 | 10 |
| Graft copolymer | SG-1 | 4 | — | — |
| | SG'-1 | — | 4 | — |
| Antioxidant | PEP36 | 0.3 | 0.3 | 0.3 |
| Dripping-preventing agent | PTFE | 0.5 | 0.5 | 0.5 |
| Flame retardancy | Total combustion time (sec) | 50 | 65 | 190 |
| | Dripping | No | No | Yes |
| Impact resistance | 23° C. (kJ/m$^2$) | 75 | 60 | 41 |

From Table 4, it is seen that the graft copolymer according to the invention can highly improve the flame retardancy-impact resistance balance of the polycarbonate/polyethylene terephthalate resin.

Second Aspect of the Invention

EXAMPLES 13 TO 18

Water (400 parts) and an amount (as solid content) given in Table 5 of sodium dodecylbenzenesulfonate (SDBS) were mixed up in a 5-necked flask equipped with a stirrer, reflux condenser, nitrogen inlet, inlet for adding monomer and thermometer, then the temperature was raised to 50° C. and, after arrival of the liquid temperature at 50° C., nitrogen substitution was effected. Then, a mixture of 10 parts of butyl acrylate and 3 parts of tert-dodecylmercaptan was added. After 30 minutes, 0.01 parts (as solid content) of paramenthane hydroperoxide was added, and the polymerization was allowed to proceed for 1 hour.

Thereafter, a mixture of 90 parts of butyl acrylate and 27 parts of tert-dodecylmercaptan was added continuously over 3 hours. The subsequent 2 hours of post-polymerization gave seed latex (seed 1 to seed 4). The weight average particle diameter, hydrophilicity and degree of swelling after synthesis were determined. The results are shown in Table 5.

A 5-necked flask equipped with a stirrer, reflux condenser, nitrogen inlet, inlet for adding monomer and thermometer was charged with a seed polymer specified in Table 6 in an amount (as solid content) specified in Table 6. Then, an emulsion of polyorganosiloxane-forming components as separately prepared by stirring a mixture composed of 300 parts of water, 0.5 parts (as solid content) of SDBS, 95 parts of octamethylcyclotetrasiloxane and 5 parts of dimethylmethylsilylpropyl methacrylate (DSMA) at 7,000 rpm for 5 minutes using a Homomixer was added all at once.

Then, a 10% aqueous solution of dodecylbenzenesulfonic acid (1 part as solid content) was added and, with stirring the system, the temperature was raised to 80° C. in a nitrogen atmosphere. After arrival at 80° C., stirring was continued at 80° C. for 6 hours and, then, the mixture was cooled to 25° C. and allowed to stand for 20 hours. Thereafter, the pH was adjusted to 6.4 with sodium hydroxide to stop the polymerization. Latex containing polyorganosiloxane particles was thus obtained.

Then, a 5-necked flask equipped with a stirrer, reflux condenser, nitrogen inlet, inlet for adding monomer and thermometer was charged with 240 parts of pure water and 70 parts (as solid content) of the above polyorganosiloxane particles. With stirring the system, the temperature was raised to 40° C. in a nitrogen atmosphere. After arrival at 40° C., 0.2 parts of sodium formaldehyde sulfoxylate (SFS), 0.01 parts of ethylenediaminetetraacetic acid disodium salt (EDTA) and 0.0025 parts of iron (II) sulfate were added and, then, a mixture of 30 parts of methyl methacrylate (MMA) and 0.06 parts (as solid content) of cumene hydroperoxide was added dropwise over 1.5 hours. After completion of the addition, stirring was continued for 1 hour. A graft copolymer latex was thus obtained. The volume average particle diameter is shown in Table 6.

The latex was then diluted with pure water to a solid concentration of 15%, a 25% aqueous solution of calcium chloride (4 parts as solid content) was added. The thus-obtained coagulated slurry was heated to 95° C., then cooled to 50° C., and dehydrated and dried to give a polyorganosiloxane-based graft copolymer in a powder form.

Then, a polycarbonate resin (Toughlon FN 2200A, product of IDEMITSU PETROCHEMICAL) and the above polyorganosiloxane-based graft copolymer in powder form were blended together according to the formulation shown in Table 6. The dripping-preventing agent used was polytetrafluoroethylene (Polyflon FA-500, product of DAIKIN Industries), and the stabilizer used was a mixture of a phosphorus-containing antioxidant (ADEKA STAB PEP36, product of ASAHI DENKA) and a phenolic antioxidant (Topanol CA, product of ICI Japan).

Pellets were produced by melting and kneading the thus-obtained compound at 270° C. on a twin-screw extruder (TEX 44 SS, product of Japan Steel Works). The pellets obtained were molded into 1/8 inch test specimens for impact resistance evaluation and 1/16 inch specimens for flame retardancy evaluation using FANUC's FAS 100 B injection molding machine set at a cylinder temperature of 280° C. The test specimens obtained were evaluated by the evaluation methods described hereinabove. The results of the impact resistance and flame retardancy evaluations of the moldings are shown in Table 6.

EXAMPLES 19 AND 20

A 5-necked flask equipped with a stirrer, reflux condenser, nitrogen inlet, inlet for adding monomer and thermometer was charged with a seed polymer specified in Table 6 in an amount (as solid content) specified in Table 6. Then, an emulsion of polyorganosiloxane-forming components as separately prepared by stirring a mixture composed of 300 parts of water, 0.5 parts (as solid content) of SDBS, 95 parts of octamethylcyclotetrasiloxane and 5 parts of mercaptopropylmethyldimethoxysilane (MPrDMS) at 7,000 rpm for 5 minutes using a Homomixer was added all at once.

Then, a 10% aqueous solution of dodecylbenzenesulfonic acid (1 part as solid content) was added and, with stirring the system, the temperature was raised to 80° C. in a nitrogen atmosphere. After arrival at 80° C., stirring was continued at 80° C. for 6 hours and, then, the mixture was cooled to 25° C. and allowed to stand for 20 hours. Thereafter, the pH was adjusted to 6.4 with sodium hydroxide to terminate the polymerization. Latex containing polyorganosiloxane particles was thus obtained.

Then, a 5-necked flask equipped with a stirrer, reflux condenser, nitrogen inlet, inlet for adding monomer and thermometer was charged with 240 parts of pure water and 70 parts (as solid content) of the above polyorganosiloxane particles. With stirring the system, the temperature was raised to 40° C. in a nitrogen atmosphere. After arrival at 40° C., 0.2 parts of sodium formaldehyde sulfoxylate (SFS), 0.01 parts of ethylenediaminetetraacetic acid disodium salt (EDTA) and 0.0025 parts of iron(II) sulfate were added and, then, a mixture of 3 parts of allyl methacrylate (ALMA) and 0.01 parts (as solid content) of cumene hydroperoxide was added all at once, and stirring was continued at 40° C. for 1 hour. Then, a mixture of 30 parts of methyl methacrylate (MMA) and 0.06 parts (as solid content) of cumene hydroperoxide was added dropwise over 1.5 hours. After completion of the addition, stirring was continued for 1 hour. A graft copolymer latex was thus obtained. The volume average particle diameter is shown in Table 6.

The latex was then diluted with pure water to a solid concentration of 15%, a 25% aqueous solution of calcium chloride (4 parts as solid content) was added. The thus-obtained coagulated slurry was heated to 85° C., then cooled to 50° C., and dehydrated and dried to give a polyorganosiloxane-based graft copolymer in a powder form.

Then, a polycarbonate resin (Toughlon FN 1900A, product of IDEMITSU PETROCHEMICAL) and the above polyorganosiloxane-based graft copolymer in powder form were blended together according to the formulation shown in Table 6. The dripping-preventing agent used was polytetrafluoroethylene (Polyflon FA-500, product of DAIKIN Industries).

Pellets were produced by melting and kneading the thus-obtained compound at 270° C. on a twin-screw extruder (TEX 44 SS, product of Japan Steel Works). The pellets obtained were molded into 1/8 inch test specimens for impact resistance evaluation and 1/16 inch specimens for flame retardancy evaluation using FANUC's FAS 100 B injection molding machine set at a cylinder temperature of 280° C. The test specimens obtained were evaluated by the evaluation methods described hereinabove. The results of the impact resistance and flame retardancy evaluations of the moldings are shown in Table 6.

COMPARATIVE EXAMPLE 14

Formulation, molding and evaluations were carried out in the same manner as in Examples 13 to 18 except that the polyorganosiloxane-based graft copolymer was not added in formulating the polycarbonate resin composition. The results are shown in Table 6.

COMPARATIVE EXAMPLE 15

Synthesis, coagulation, heat treatment, dehydration/drying/powder formation, formulation, molding and evaluations were carried out in the same manner as in Examples 13 to 18 except that no seed polymer was added in polymerizing the latex containing polyorganosiloxane particles. The results are shown in Table 6.

COMPARATIVE EXAMPLE 16

Formulation, molding and evaluations were carried out in the same manner as in Examples 19 and 20 except that the polyorganosiloxane-based graft copolymer was not added in formulating the polycarbonate resin compositions. The results are shown in Table 6.

COMPARATIVE EXAMPLE 17

Synthesis, coagulation, heat treatment, dehydration/drying/powder formation, formulation, molding and evaluations were carried out in the same manner as in Examples 19 to 20 except that no seed polymer was added in polymerizing the latex containing polyorganosiloxane particles. The results are shown in Table 6.

TABLE 5

|  | Seed 1 | Seed 2 | Seed 3 | Seed 4 |
|---|---|---|---|---|
| Sodium dodecylbenzenesulfonate (phr) | 8 | 4 | 2 | 1 |
| Butyl acrylate (phr) | 100 | 100 | 100 | 100 |
| tert-Dodecylmercaptan (phr) | 30 | 30 | 30 | 30 |
| Average particle diameter (μm) | 0.04 | 0.06 | 0.08 | 0.09 |
| Hydrophilicity (%) | 80 | 80 | 80 | 80 |
| Swelling capacity (times) | 10 | 8 | 6 | 5 |

TABLE 6

| | | Examples | | | | | | | | Comparative Examples | | | |
|---|---|---|---|---|---|---|---|---|---|---|---|---|---|
| | | 13 | 14 | 15 | 16 | 17 | 18 | 19 | 20 | 14 | 15 | 16 | 17 |
| Formulation | Polycarbonate (parts) | 100 | 100 | 100 | 100 | 100 | 100 | 100 | 100 | 100 | 100 | 100 | 100 |
| | Dripping-preventing agent (parts) | 0.5 | 0.5 | 0.5 | 0.5 | 0.5 | 0.5 | 0.3 | 0.3 | 0.5 | 0.5 | 0.3 | 0.3 |
| | Stabilizer (parts) | 0.6 | 0.6 | 0.6 | 0.6 | 0.6 | 0.6 | — | — | 0.6 | 0.6 | — | — |
| | Flame retardant addition level (parts) | 3 | 3 | 3 | 3 | 3 | 3 | 3 | 3 | — | 3 | — | 3 |
| Flame retardant | Seed polymer | Seed 1 | Seed 2 | Seed 1 | Seed 2 | Seed 3 | Seed 4 | Seed 1 | Seed 2 | — | — | — | — |
| | Seed amount (parts) | 1 | 1 | 2 | 2 | 2 | 2 | 1 | 1 | — | — | — | — |
| | Graft crosslinking agent | DSMA | DSMA | DSMA | DSMA | DSMA | DSMA | MPrDMS | MPrDMS | — | DSMA | — | MPrDMS |
| | One-stage graft | — | — | — | — | — | — | ALMA | ALMA | — | — | — | ALMA |
| | Two-stage graft | MMA | MMA | MMA | MMA | MMA | MMA | MMA | MMA | — | MMA | — | MMA |
| | Average particle diameter (μm) | 0.23 | 0.25 | 0.2 | 0.2 | 0.21 | 0.22 | 0.18 | 0.15 | — | 0.2 | — | 0.2 |
| Characteristics | Impact resistance −10° C. (kJ/m²) | 50 | 50 | 50 | 50 | 50 | 50 | 50 | 50 | 10 | 30 | 20 | 35 |
| | Flame retardancy Total combustion time (sec) | 40 | 40 | 40 | 40 | 40 | 40 | 50 | 45 | 180 | 40 | 130 | 50 |
| | UL 94 V grading | V-0 | V-0 | V-0 | V-0 | V-0 | V-0 | V-0 | V-0 | Not-V | V-0 | Not-V | V-0 |

INDUSTRIAL APPLICABILITY

The invention can provide a flame retardant capable of giving thermoplastic resin compositions excellent in flame retardancy-impact resistance balance when added to thermoplastic resins. Furthermore, thermoplastic resin compositions excellent in flame retardancy-impact resistance can be provided when the flame retardant is incorporated in thermoplastic resins.

The invention claimed is:

1. A polyorganosiloxane-containing graft copolymer which is made by
   Step 1: graft polymerizing a vinyl monomer (B) comprising 100 to 90% by weight of a polyfunctional monomer (b-1) containing two or more polymerizable unsaturated bonds and 0 to 10% by weight of another copolymerizable monomer (b-2) onto polyorganosiloxane particles (A1), wherein the graft polymerizing is conducted with 0.5 to 5 parts by weight of vinyl monomer (B) and 60 to 90 parts (as solid content) by weight of polyorganosiloxane particles (A1),
   followed by Step 2: graft polymerization of a vinyl monomer (C) onto the graft polymerization product obtained in Step 1, wherein the graft polymerizing of step 2 is conducted with 5 to 39 parts by weight of a vinyl monomer (C),
   and wherein the sum of (A1), (B) and (C) being 100 parts by weight,
   wherein the polyfunctional monomer (b-1) is at least one monomer selected from the group consisting of allyl methacrylate, triallyl cyanurate, triallyl isocyanurate, diallyl phthalate, ethylene glycol dimethacrylate, 1,3-butylene glycol dimethacrylate, and divinylbenzene.

2. The polyorganosiloxane-containing graft copolymer according to claim 1,
   wherein the polyorganosiloxane particles (A1) have a volume average particle diameter of 0.008 to 0.6 μm.

3. The polyorganosiloxane-containing graft copolymer according to claim 1, wherein the vinyl monomer (C) gives a polymer thereof having a solubility parameter of 9.15 to 10.15 $(cal/cm^3)^{1/2}$.

4. The polyorganosiloxane-containing graft copolymer according to claim 1,
   wherein the polyorganosiloxane particles (A1) are in a latex form.

5. The polyorganosiloxane-containing graft copolymer according to claim 1,
   wherein the vinyl monomer (C) comprises at least one monomer selected from the group consisting of aromatic vinyl monomers, vinyl cyanide monomers, (meth)acrylate ester monomers and carboxyl group-containing vinyl monomers.

6. A flame retardant
   which comprises the polyorganosiloxane-containing graft copolymer according to claim 1.

7. A flame retardant resin composition
   which comprises 0.1 to 30 parts by weight, per 100 parts by weight of a thermoplastic resin, of the flame retardant according to claim 6 as incorporated in the thermoplastic resin.

8. The flame retardant resin composition according to claim 7, wherein the thermoplastic resin is a polycarbonate resin.

9. The polyorganosiloxane-containing graft copolymer according to claim 2, wherein the vinyl monomer (C) gives a polymer thereof having a solubility parameter of 9.15 to 10.15 $(cal/cm^3)^{1/2}$.

10. The polyorganosiloxane-containing graft copolymer according to claim 2,
wherein the polyorganosiloxane particles (A1) are in a latex form.

11. The polyorganosiloxane-containing graft copolymer according to claim 3,
wherein the polyorganosiloxane particles (A1) are in a latex form.

12. The polyorganosiloxane-containing graft copolymer according to claim 2,
wherein the vinyl monomer (C) comprises at least one monomer selected from the group consisting of aromatic vinyl monomers, vinyl cyanide monomers, (meth)acrylate ester monomers and carboxyl group-containing vinyl monomers.

13. The polyorganosiloxane-containing graft copolymer according to claim 3,
wherein the vinyl monomer (C) comprises at least one monomer selected from the group consisting of aromatic vinyl monomers, vinyl cyanide monomers, (meth)acrylate ester monomers and carboxyl group-containing vinyl monomers.

14. The polyorganosiloxane-containing graft copolymer according to claim 1, wherein said polyorganosiloxane particles (A1) are made of polyorganosiloxanes alone.

15. The polyorganosiloxane-containing graft copolymer according to claim 1, wherein said polyorganosiloxane particles (A1) are made of polyorganosiloxanes and not more than 5% by weight of other polymer(s).

16. The polyorganosiloxane-containing graft copolymer according to claim 1, wherein said polyorganosiloxane particles (A1) are made of polyorganosiloxanes and not more than 5% by weight of polybutyl acrylate and butyl acrylate-styrene copolymer.

17. The polyorganosiloxane-containing graft copolymer according to claim 1, wherein said polyorganosiloxane particles (A1) are selected from the group consisting of polymethylphenylsiloxane particles and dimethylsiloxane-diphenylsiloxane copolymer particles.

18. The polyorganosiloxane-containing graft copolymer according to claim 1, wherein said polyorganosiloxane particles (A1) are made by polymerizing
(1) an organosiloxane,
(2) a bifunctional silane compound,
(3) an organosiloxane and a bifunctional silane compound,
(4) an organosiloxane and a vinylic polymerizable group-containing silane compound,
(5) a bifunctional silane compound and a vinylic polymerizable group-containing silane compound or
(6) an organosiloxane, a bifunctional silane compound and a vinylic polymerizable group-containing silane compound.

19. The polyorganosiloxane-containing graft copolymer according to claim 18, wherein said polymerizing to make said polyorganosiloxane particles (A1) is with at least one trifunctional silane compound.

20. The polyorganosiloxane-containing graft copolymer according to claim 18, wherein
said organosiloxane is selected from the group consisting of hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), and hexadecamethylcyclooctasiloxane (D8),
said bifunctional silane compound is selected from the group consisting of diethoxydimethylsilane, dimethoxydimethylsilane, diphenyldimethoxysilane, diphenyldiethoxysilane, 3 -chloropropylmethyldimethoxysilane, 3 -glycidoxypropylmethyldimethoxysilane, heptadecafluorodecylmethyldimethoxysilane, trifluoropropylmethyldimethoxysilane, octadecylmethyldimethoxysilane, and said vinylic polymerizable group-containing silane compound is selected from the groups consisting of (meth)acryloyloxy group-containing silane compounds, vinylphenyl group-containing silane compounds, vinyl group-containing silane compounds, and mercapto group-containing silane compounds.

21. The polyorganosiloxane-containing graft copolymer according to claim 18, wherein said polyorganosiloxane particles (A1) are made by polymerizing
70 to 100% by weight of:
octamethylcyclotetrasiloxane (D4);
a mixture of hexamethylcyclotrisiloxane (D3), octamethylcyclotetrasiloxane (D4), decamethylcyclopentasiloxane (D5), dodecamethylcyclohexasiloxane (D6), and tetradecamethylcycloheptasiloxane (D7); or
a mixture of D3 to D8, and
0 to 30% by weight of:
Diphenyldimethoxysilane;
Diphenyldiethoxysilane; or
a mixture of diphenyldimethoxysilane and diphenyldiethoxysilane.

22. The polyorganosiloxane-containing graft copolymer according to claim 18, wherein said vinylic polymerizable group-containing silane compound is selected from the group consisting of γ-methacryloyloxypropyldimethoxymethylsilane, γ-methacryloyloxypropyltrimethoxysilane, γ-methacryloyloxypropyltriethoxysilane, γ-methacryloyloxypropyldiethoxymethylsilane, γ-acryloyloxypropyldimethoxymethylsilane, γ-acryloyloxypropyltrimethoxysilane p-vinylphenyldimethoxymethylsilane, p-vinylphenyltrimethoxysilane, vinylmethyldimethoxysilane, vinyltrimethoxysilane, vinyltriethoxysilane, mercaptopropyltrimethoxysilane, and mercaptopropyldimethoxymethylsilane.

* * * * *